US012670655B2

(12) United States Patent
Livesley et al.

(10) Patent No.: US 12,670,655 B2
(45) Date of Patent: Jun. 30, 2026

(54) PRE-FILTERING NODES FOR BOUNDING VOLUME HIERARCHY

(71) Applicants:Advanced Micro Devices, Inc., Santa Clara, CA (US); ATI Technologies ULC, Markham (CA)

(72) Inventors: Michael John Livesley, Milton Keynes (GB); David William John Pankratz, Markham (CA); Sean Keely, Austin, TX (US); Andrew Erin Kensler, Bellevue, WA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 214 days.

(21) Appl. No.: 18/477,871

(22) Filed: Sep. 29, 2023

(65) Prior Publication Data
US 2025/0111586 A1 Apr. 3, 2025

(51) Int. Cl.
*G06T 15/06* (2011.01)
*G06T 17/00* (2006.01)

(52) U.S. Cl.
CPC ............ *G06T 15/06* (2013.01); *G06T 17/005* (2013.01); *G06T 2210/21* (2013.01)

(58) Field of Classification Search
CPC .... G06T 15/06; G06T 17/005; G06T 2210/21
See application file for complete search history.

(56) References Cited

U.S. PATENT DOCUMENTS

| | | | |
|---|---|---|---|
| 2021/0342980 A1 | 11/2021 | Liu et al. | |
| 2021/0407171 A1 | 12/2021 | Clark et al. | |
| 2022/0207690 A1* | 6/2022 | Burns ..................... | G06T 15/06 |
| 2022/0366525 A1 | 11/2022 | Benthin et al. | |
| 2023/0114852 A1 | 4/2023 | Csefalvay et al. | |
| 2023/0206541 A1 | 6/2023 | Saleh et al. | |
| 2025/0124645 A1* | 4/2025 | Burns ..................... | G06T 15/06 |

OTHER PUBLICATIONS

Howard et al., Quantized bounding volume hierarchies for neighbor search in molecular simulations on graphics processing, Mar. 25, 2019, 28 pages, downloaded from https://arxiv.org/pdf/1901.08088 on Nov. 17, 2025. (Year: 2019).*

* cited by examiner

*Primary Examiner* — Haixia Du
(74) *Attorney, Agent, or Firm* — Volpe Koenig

(57) ABSTRACT

A technique for performing ray tracing operations is provided. The technique includes for a ray being tested for intersection with geometry associated with a bounding volume hierarchy, traversing to a pre-filtering node that includes information for filtering out triangles of a leaf node of the bounding volume hierarchy; evaluating a quantized ray that corresponds to the ray against quantized triangles of the pre-filtering node to filter out one or more triangles of the leaf node from consideration; and testing the triangles of the leaf node that are not filtered out and not testing the triangles of the leaf node that are filtered out.

20 Claims, 8 Drawing Sheets

100

402

404

700

Node Reference 704          Node Reference 704

Bounding Volume
Information 710

Non-Leaf Node 702

Bounding Volume
Information

Pre-Filtering Node 706

Quantized Triangle
Information 708

Pre-Filtering Node 706

Quantized Triangle
Information 708

Leaf Node 712

Triangle Information 714

Leaf Node 712

Triangle Information 714

900

Traverse to a pre-filtering node

902

Perform setup operations, including normalizing ray and locating origin within bounding volume of pre-filtering node

904

Evaluate quantized ray against quantized triangles to filter out floating point triangles for intersection testing

906

Test ray against floating point triangles that were not filtered out

908

PRE-FILTERING NODES FOR BOUNDING VOLUME HIERARCHY

BACKGROUND

In image synthesis, ray tracing is utilized to find a nearest intersection of a given ray with a scene where light propagation is simulated.

BRIEF DESCRIPTION OF THE DRAWINGS

A more detailed understanding can be had from the following description, given by way of example in conjunction with the accompanying drawings wherein.

DETAILED DESCRIPTION

A technique for performing ray tracing operations is provided. The technique includes for a ray being tested for intersection with geometry associated with a bounding volume hierarchy, traversing to a pre-filtering node that includes information for filtering out triangles of a leaf node of the bounding volume hierarchy; evaluating a quantized ray that corresponds to the ray against quantized triangles of the pre-filtering node to filter out one or more triangles of the leaf node from consideration; and testing the triangles of the leaf node that are not filtered out and not testing the triangles of the leaf node that are filtered out.

Figure 1:
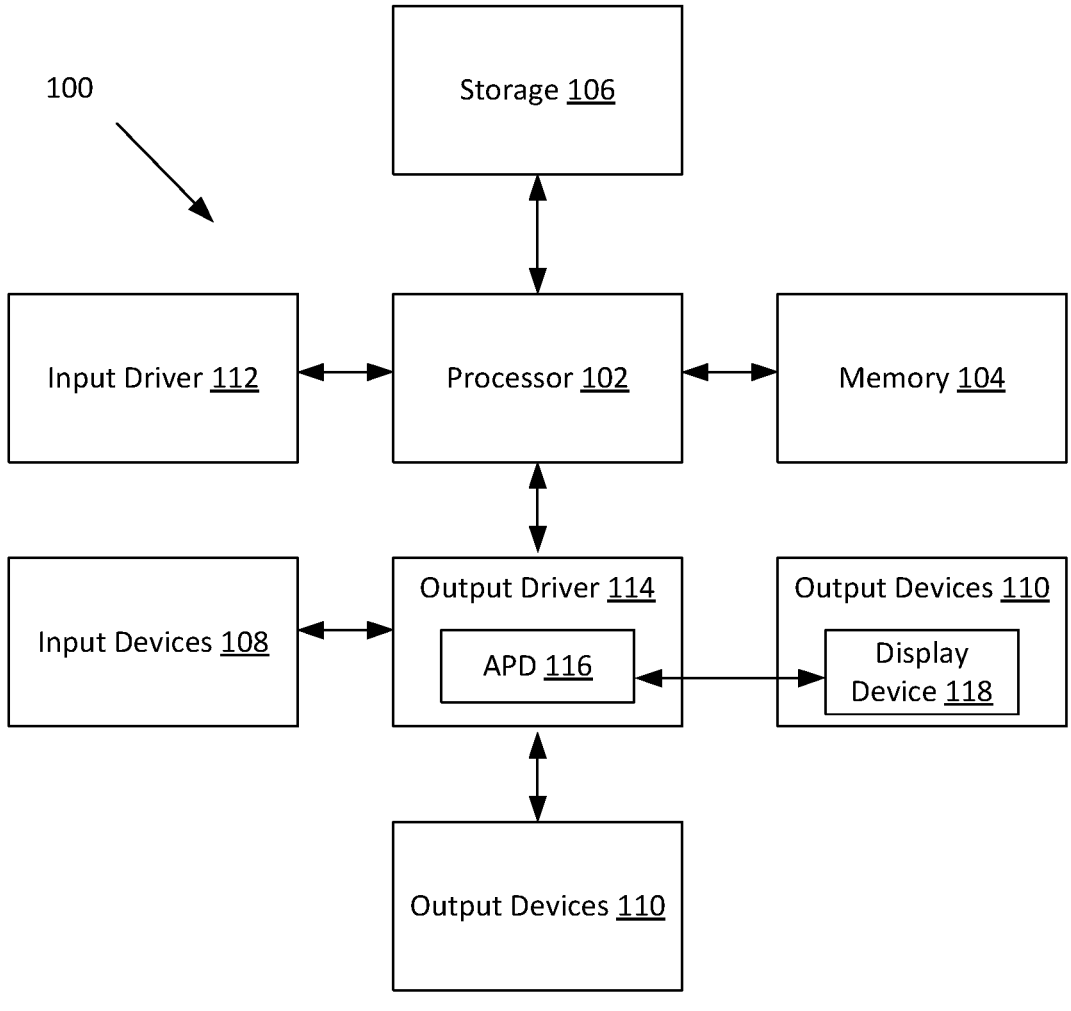
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
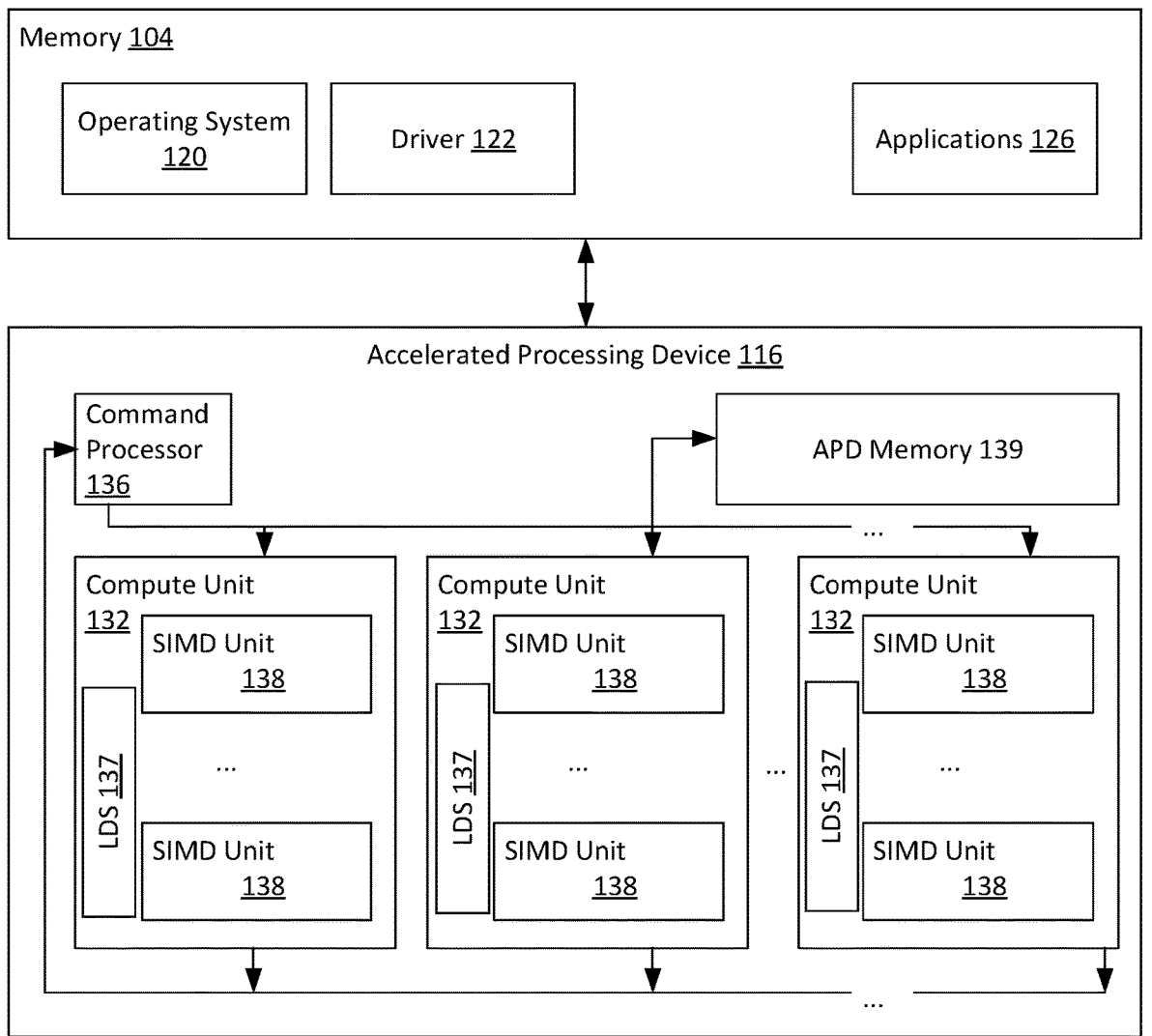
FIG. 2 is a block diagram of the device of FIG. 1, illustrating additional detail, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The compute units 132 are sometimes referred to as "parallel processing units 202" herein. Each compute unit 132 includes a local data share ("LDS") 137 that is accessible to wavefronts executing in the compute unit 132 but not to wavefronts executing in other compute units 132. A global memory 139 stores data that is accessible to wavefronts executing on all compute units 132. In some examples, the local data share 137 has faster access characteristics than the global memory 139 (e.g., lower latency and/or higher bandwidth). Although shown in the APD 116, the global memory 139 can be partially or fully located in other elements, such as in system memory 104 or in another memory not shown or described. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline (e.g., custom operations performed to supplement processing performed for operation of the graphics pipeline). An application 126 or other software executing on the processor 102 transmits programs that define such computation tasks to the APD 116 for execution.

The APD 116 is configured to implement features of the present disclosure by executing a plurality of functions as described in more detail below. For example, the APD 116 is configured to receive images comprising one or more three dimensional (3D) objects, divide images into a plurality of tiles, execute a visibility pass for primitives of an image, divide the image into tiles, execute coarse level tiling for the tiles of the image, divide the tiles into fine tiles and execute fine level tiling of the image. Optionally, the front end geometry processing of a primitive determined to be in a first one of the tiles can be executed concurrently with the visibility pass.

Figure 3:
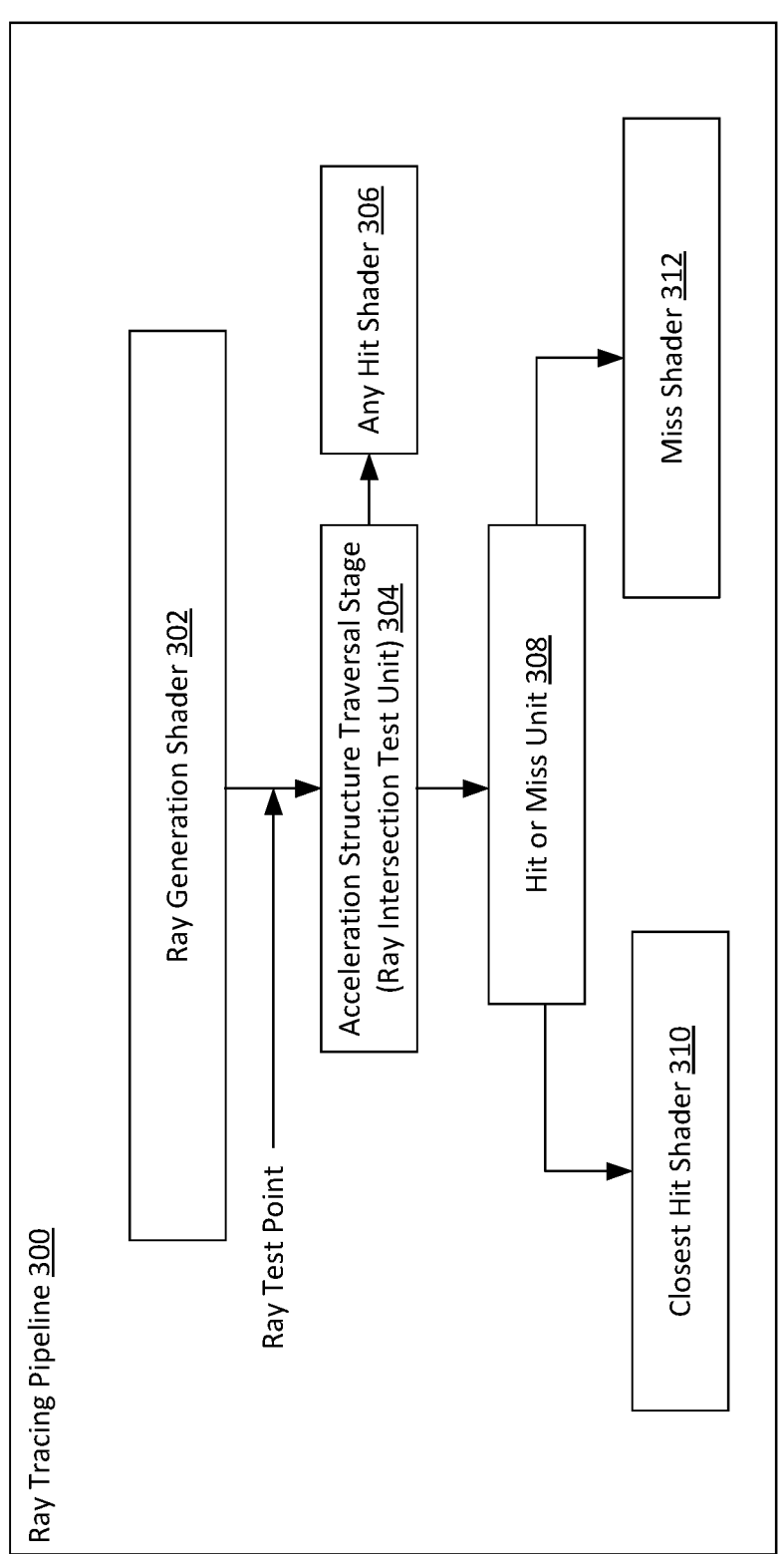
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is precompiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. In some examples, rendering a scene involves casting at least one ray for each of a plurality of pixels of an image to obtain colors for each pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent different axis aligned bounding boxes cover different portions of the entire region. Each of those two children has two child nodes that represent axis aligned bounding boxes that subdivide the space of their parents, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
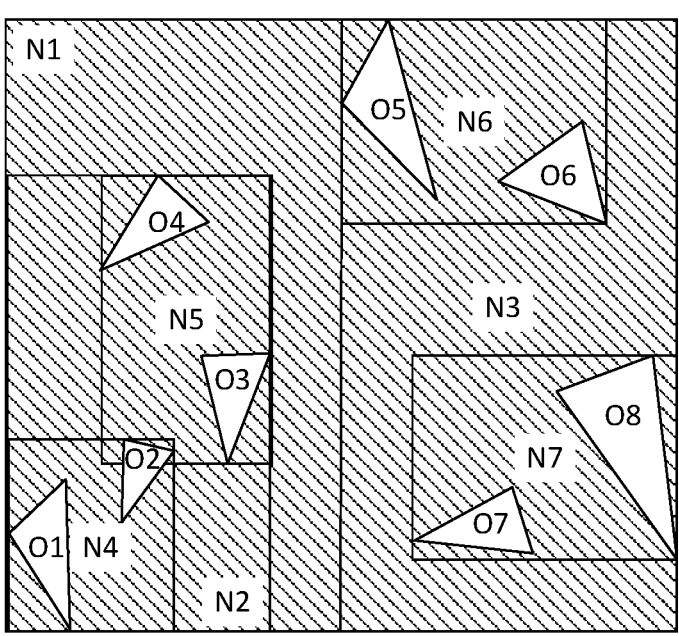
FIG. 4 is an illustration of a bounding volume hierarchy ("BVH"), according to an example.
Figure 4:
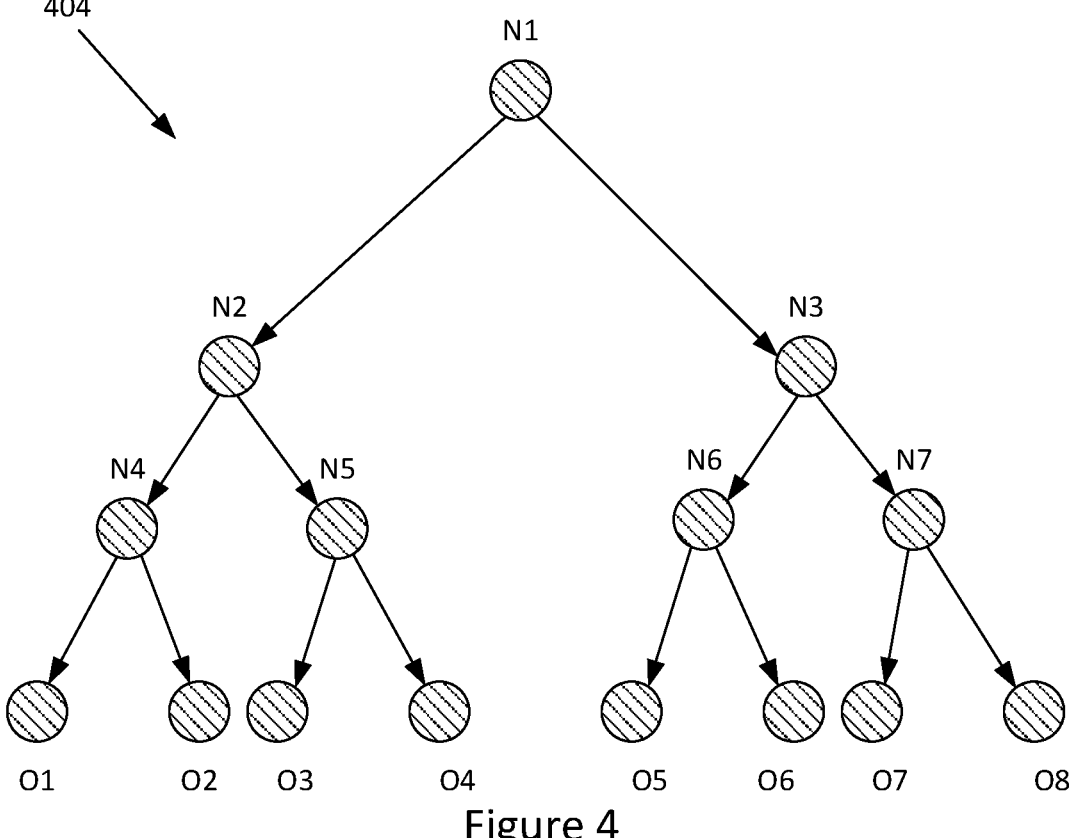

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

As just described, a BVH includes non-leaf nodes N, which reduce processing workload associated with determining which primitives a ray intersects with. As also just described, such nodes are often embodied as axis-aligned bounding boxes that bound the underlying geometry (e.g., the geometry of the nodes that are descendants of the non-leaf nodes). While these non-leaf nodes provide benefit by eliminating non-leaf nodes and leaf nodes from consideration, techniques are provided herein for further elimination of nodes of the BVH from testing for intersection with a ray. According to these techniques, a pre-filtering operation is performed using quantized versions of underlying geometry of the BVH. The term "underlying geometry" means the geometry specified by the leaf nodes Q (e.g., triangles), as contrasted with the geometry specified by the non-leaf nodes N (e.g., bounding boxes). While the final evaluation of the ray against the underlying geometry is performed using expensive floating-point arithmetic, the pre-filtering operation uses approximated ("quantized") versions of such underlying geometry, specified using relatively low-precision integer values, to filter out triangles that are not intersected by the ray. The remaining triangles, which may or may not actually intersect the ray, are tested for intersection with the ray using the expensive floating-point test. The pre-filtering operation thus reduces the number of such floating-point tests that are performed, using relatively less computationally-expensive integer-based pre-filtering operations, meaning that a smaller number of the more computationally-expensive floating-point intersection tests need to be performed. In a sense, the pre-filtering operation serves a similar purpose as the non-leaf nodes. As with the non-leaf nodes, using these pre-filtering nodes to filter out triangles that are not intersected by the ray serves to reduce the number of triangles that need to be tested for intersection with the ray.

In some examples, pre-filtering nodes are nodes within the BVH that are interposed between non-leaf nodes and leaf nodes. When the acceleration structure traversal stage 304 traverses to a pre-filtering node, the acceleration structure traversal stage 304 tests all quantized triangles of the pre-filtering node for intersection with the ray. For each quantized triangle that the acceleration structure traversal stage 304 determines is not intersected by the ray, the acceleration structure traversal stage 304 filters out, and thus discards and does not test, the corresponding triangle in the leaf node that is parented by the pre-filtering node. For other quantized triangles, the acceleration structure traversal stage 304 tests the corresponding triangles of that leaf node for intersection with the ray.

In some examples, a BVH builder (not shown, but embodied, for example, as software, hardware, or a combination thereof, either within the same system as the ray tracing pipeline 300 or within a different system), builds a first version of a BVH in a first pass and then inserts pre-filtering nodes into such first version. The insertion includes quantizing the triangles for the leaf nodes associated with the pre-filtering nodes and storing such quantizations in the pre-filtering node, as a part of the associated leaf node.

Figure 5:
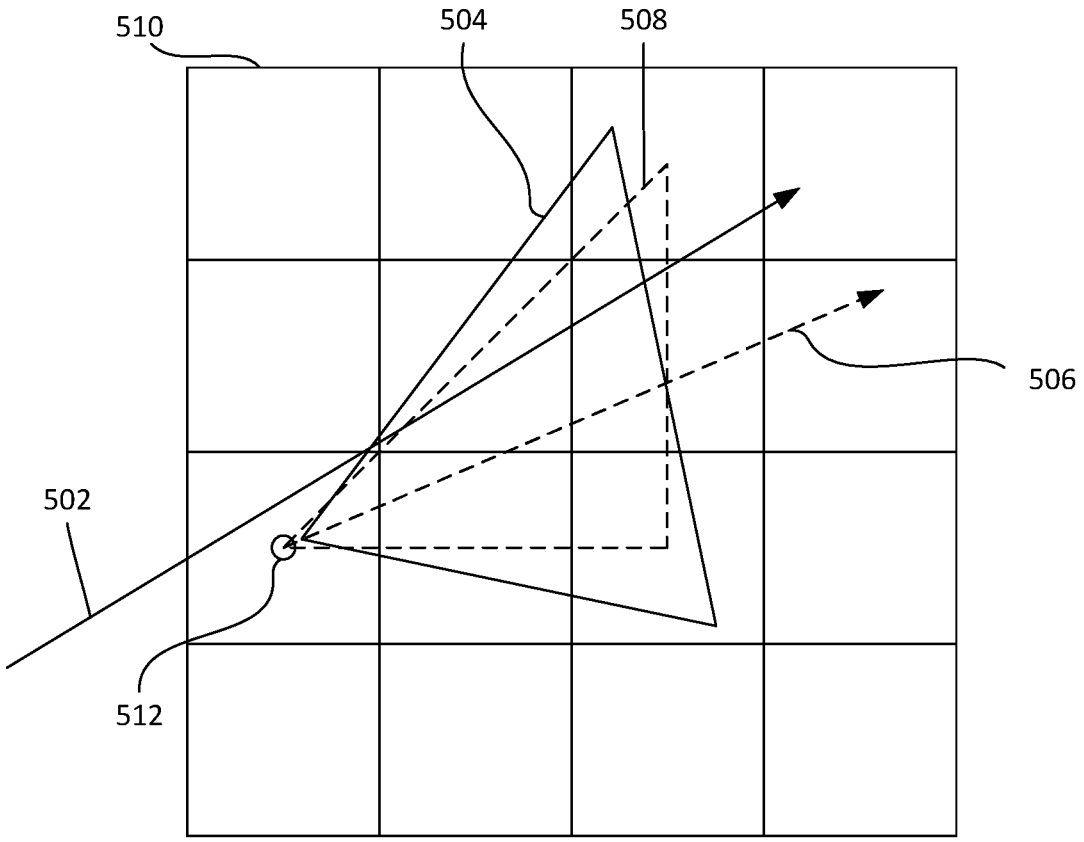
FIG. 5 illustrates a test for intersection of a ray with a quantized triangle, according to an example.

FIG. 5 illustrates a test for intersection of a ray with a quantized triangle, according to an example. The non-quantized ray 502 and non-quantized triangle 504 are illustrated with solid lines, and the quantized ray 506 and quantized triangle 508 are illustrated with dotted lines. These items are illustrated in two dimensions for clarity, although it should be understood that the ideas described herein apply to three-dimensional geometry as well.

In order to perform the test for intersection of the quantized ray, the acceleration structure traversal stage 304 performs several operations. Specifically, the acceleration structure traversal stage 304 obtains a quantized version of the triangle. This information is embedded within the BVH, as described elsewhere herein. In addition, the acceleration structure traversal stage 304 obtains a quantized version of the ray. Because the geometry of the ray is not known when the BVH is built, the acceleration structure traversal stage 304 must quantize the ray upon traversing to a pre-filtering node.

In FIG. 5, several cells 510 of the quantized space are shown. Because the geometry in the quantized triangle intersection test is quantized, every coordinate value can be represented as falling on the center of one of these cells 510. Quantizing the ray includes placing the origin of that ray at the center of one of such cells 510.

In addition, in some examples, quantizing the ray includes finding a point within the bounding volume that bounds all quantized triangles of the pre-filtering node. This point is an origin for the quantized ray. More specifically, it is possible for the ray origin for the unquantized ray 502 to be outside such box, and in some cases, it is possible for that origin to be far outside of the box. However, in the test for intersection of the quantized ray with the quantized triangles, the range of values represented by the integer coordinates only extends from the minimum extents of the bounding box to the maximum extents of the bounding box. Thus, a point outside of the bounding box is not representable in such a coordinate system. In some examples, the acceleration structure traversal stage 304 finds a point that is representable by that quantized the system and that is at a point along the ray. This point is, itself, at the center of a cell 510, due to needing to be representable in the quantized coordinate system. In summary, one operation includes finding an origin for the quantized ray, where the origin falls within the bounding box that bounds the quantized triangles of the pre-filtering node. An example origin 512 of the quantized ray 506 is illustrated.

In some examples, yet another operation includes adjusting the vertices of the quantized triangle 508 such that the adjusted quantized triangle (not shown) has a normal that is parallel to the ray 502 (or at least is as close to parallel to that ray as is possible given the precision of the integer numerical system). This operation prevents false negatives that would occur with grazing rays—rays that are almost but not completely parallel to the triangle and that hit the triangle in the non-quantized version but that do not hit the triangle in the quantized version, without such adjustment to the triangle vertices. Making the triangle perpendicular to the quantized ray prevents false negatives due to grazing rays from occurring.

In some examples, yet another operation includes normalizing the quantized ray based on the ratio of the dimensions of the bounding box that bounds the quantized triangles. More specifically, as described elsewhere herein, the range of values representable by the integer values used to express geometry in the quantized space extends from the minimum extents of the bounding box to the maximum extents of the bounding box. For example, the lowest expressible value for this quantized numerical system is at the minimum extent of the bounding box and the highest expressible value is at the maximum extent of the bounding box. Because these values are integers that have the same range regardless of direction, the space within the bounding box has the same numerical range in each direction. However, the actual bounds of the bounding box in the floating-point numerical space of the non-quantized ray 502 does not have such a characteristic. For example, it is possible for the horizontal extents of the bounding box to be much smaller than the vertical extents in the floating-point space even though the integer space used to represent both vertical and horizontal coordinates for the quantized bounding box has the same extents (e.g., from the minimum value representable by an integer of a particular bit size to the maximum value represented by an integer of that bit size). Thus, the ray must be normalized to account for this difference. This normalization involves scaling the ray in one or two dimensions in order to match the mismatch between quantized space and floating-point space. For example, if the bounding box has a horizontal size of 2, a vertical size of 1, and a depth of 4, then the horizontal size of the ray is stretched by a factor of 2 and the vertical size of the ray is stretched by a factor of 4.

Once the above operations are performed, a quantized ray in the coordinate space of the bounding box for the pre-filtering node is obtained. The acceleration structure traversal stage 304 tests this quantized ray for intersection with the quantized triangle. In one example, the quantized triangles having adjusted vertices is considered "projected" into a 2-dimensional space having the origin of the ray as a point in that space. In other words, since the normal of the quantized triangle is substantially parallel to the ray, from the viewpoint of the ray, the triangle looks like a 2 dimensional triangle with the ray occupying a point in that 2-dimensional triangle. Thus, in this example, the test of whether the ray intersects the triangle is equivalent to the test of whether the origin point of the ray is within that 2-dimensional triangle.

Figure 6:
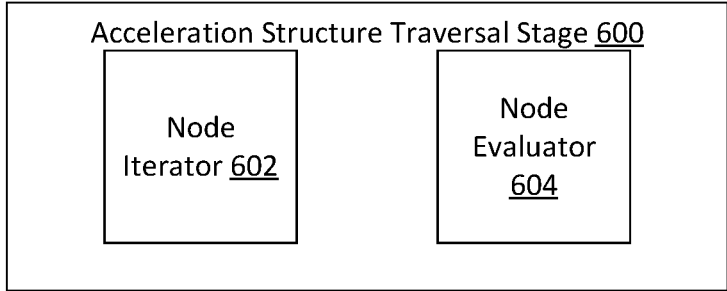
FIG. 6 illustrates an example implementation of an acceleration structure traversal stage.

As can be seen, there is some "setup" work that is performed before this intersection test is performed. For example, this setup work includes quantizing the ray, which includes selecting an origin point within the bounding volume that bounds the quantized triangles of the pre-filtering node, quantizing the direction of the ray, and normalizing the ray. This setup work produces intermediate values that are then consumed by subsequent operations that test the ray for intersection with the quantized triangles. As this setup information is required per ray, and the APD 116 is capable of testing a very large number of rays for intersection with triangles at any given time, the need to store this information could lead to high memory requirements (e.g., this need could result in the need to include a large amount of dedicated memory elements to store such information). FIG. 6 illustrates additional information regarding this need.

FIG. 6 illustrates an example implementation of an acceleration structure traversal stage 600, such as the acceleration structure traversal stage 304 of FIG. 3. The acceleration structure traversal stage 600 includes a node iterator 602 and a node evaluator 604. The node iterator 602 and node evaluator 604 are each implementable as software executing on a programmable processor (e.g., a compute unit 132), as hardware (e.g., a circuit, such as a fixed function circuit or other circuitry configured to perform the operations) or as a combination thereof. In some examples, the node iterator 602 comprises a shader program configured to execute on the compute units 132 and the node evaluator 604 comprises fixed function hardware that is configured to test a ray against the geometry of specific nodes, as requested by the node iterator 602.

In some examples, the node iterator 602 maintains a collection of nodes of a BVH to be tested for intersection with a ray. The node iterator 602 proceeds through a series of iterations through the BVH to test the ray for intersection against the geometry of the BVH. In any particular iteration, the node iterator 602 selects one or more nodes of the collection of nodes and requests the node evaluator 604 to test the ray for intersection against such one or more nodes. Such nodes can be leaf nodes or non-leaf nodes. The node evaluator evaluates the ray against the one or more nodes and provides the results to the node iterator 602. These results indicate whether the ray intersects the geometry of the one or more nodes. Based on the results, the node iterator 602 places one or more additional nodes into the collection of nodes for testing in a subsequent iteration. Traversal of a BVH for a ray ends when there are no more nodes in the collection of nodes (although traversal can end earlier than that as well).

As just described, the node evaluator 604 performs intersection tests for whole nodes—e.g., non-leaf nodes or leaf nodes, or several of these nodes at a time. Thus, in addition to processing whole non-leaf nodes or whole leaf nodes, the node evaluator 604 also processes pre-filtering nodes at the request of the node iterator 602. More specifically, when the node iterator 602 encounters a pre-filtering node, the node iterator 602 places that node into the collection of nodes. In response to fetching that pre-filtering node from the node collection, the node iterator 602 requests the node evaluator 604 to evaluate the ray against the pre-filtering node, in order to determine whether the ray intersects the quantized triangles. It is advantageous to include the information needed for this evaluation, including the setup portion described above, within the pre-filtering node itself, to reduce the amount of data that needs to be fetched when the node evaluator 604 evaluates such a pre-filtering node. In an example, as described elsewhere herein, one of these setup operations includes determining an origin of the ray within the bounding box that bounds all quantized triangles of the pre-filtering node. This information could be retained from traversal of a parent bounding box node. However, such retention would require additional storage of data, for example, transfer of that data back to the node iterator 602, subsequent storage by the node iterator 602, and then provision of that data back to the node evaluator 604. Alternatively, the node evaluator 604 itself could cache that data for subsequent use. This need to store the information about the result of a previous box intersection test can be considered detrimental. Thus, the present disclosure provides pre-filtering nodes that include information that indicates the bounding box of the quantized triangles stored within. With this information, the node evaluator 604 is able to perform the above setup operations without storing information between different iterations.

Figure 7:
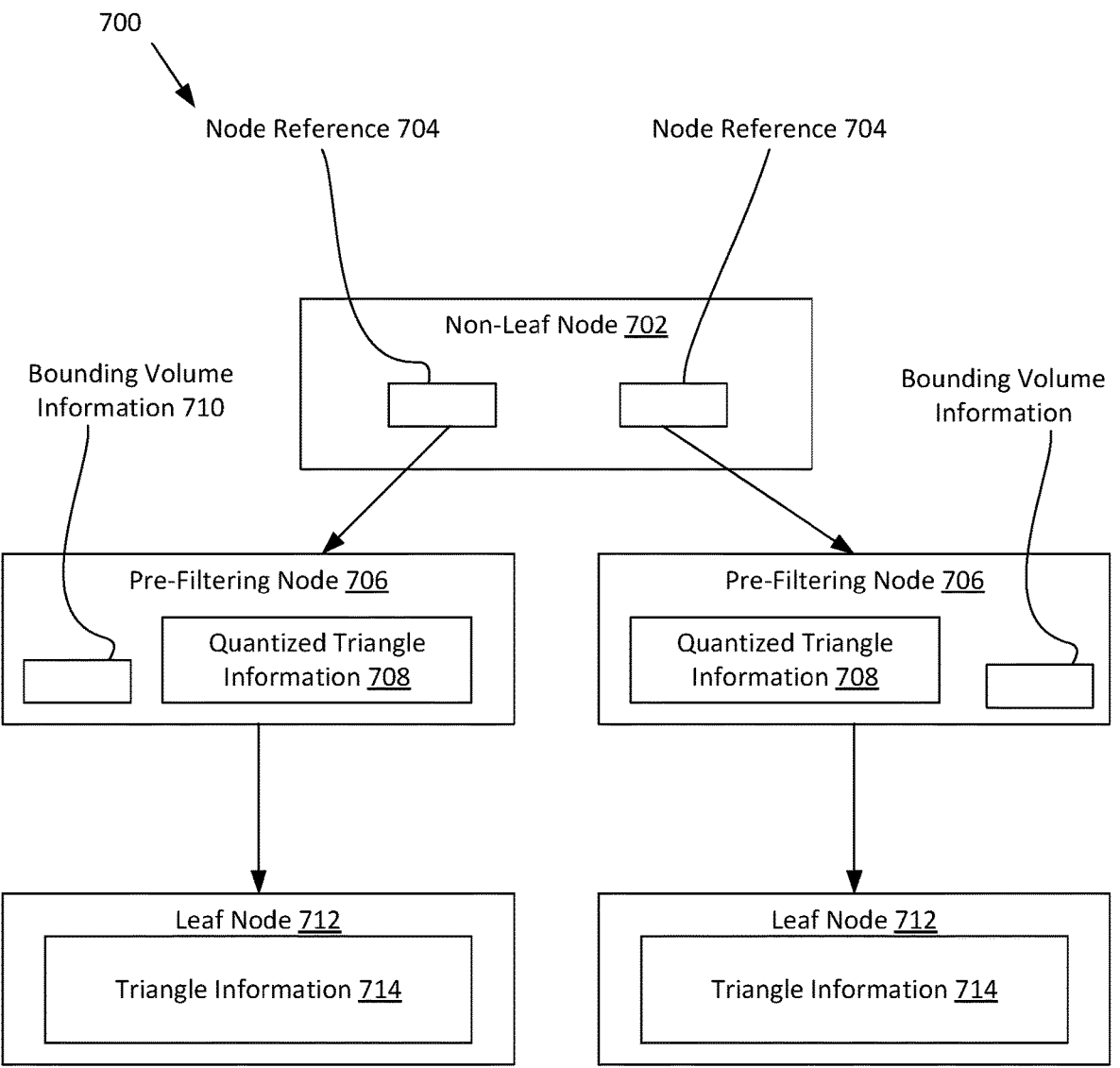
FIG. 7 illustrates a portion of a BVH, according to an example.

Additional detail regarding the acceleration structure traversal stage 600 and a BVH including pre-filtering nodes is now provided with respect to FIG. 7. Specifically, FIG. 7 illustrates a portion of a BVH 700, according to an example. The BVH portion 700 includes a non-leaf node 702. The non-leaf node 702 includes two node references 704. Each node reference 704 includes bounding volume data and a pointer to another node. The bounding volume data indicates a bounding volume that bounds all contents of the node pointed to by the node reference 704, including all descendants of that node. In an example, the bounding volume bounds all of the triangles that are descendants of that node.

As shown, each node reference 704 includes a pointer to a pre-filtering node 706. The pre-filtering nodes include quantized triangle information 708 which specify quantized triangles as described elsewhere herein. The pre-filtering nodes 706 also include bounding volume information 710. The bounding volume information 710 specifies at least a portion of a bounding volume that bounds the quantized triangle information 708. Each pre-filtering node 706 points to a leaf node 712. The leaf node 712 includes (non-quantized) triangle information 714. In some examples, the quantized triangle information 708 is expressed in an integer format and the triangle information 714 is expressed in a floating-point format. In some examples, the quantized triangle information 708 includes information for one or more quantized triangles and each such quantized triangle has a corresponding triangle in the triangle information 714. The quantized triangles approximate the non-quantized triangles by representing the floating-point vertices of such non-quantized triangles in an integer number space. In some examples, the acceleration structure traversal stage 304 knows or calculates an error bounds for the quantized triangles. This error bounds represents the maximum quantization error in the quantized representation of the triangle as compared with the floating-point representation. In other words, this error allows the acceleration structure traversal stage 304 to determine whether a ray intersects or might intersect a triangle, based on a determination of whether the ray intersects the quantized triangle. More specifically, in the event that the acceleration structure traversal stage 304 is determined to actually intersect the triangle or to pass less than the maximum quantization error outside of the quantized triangle, the acceleration structure traversal stage 304 does not discard the corresponding triangle of the leaf node 712 from consideration. By contrast, in the event that the acceleration structure traversal stage 304 determines that the ray passes outside of the triangle by an amount that is at least as large as the maximum quantization error, the acceleration structure traversal stage 304 discards the corresponding (floating-point) triangle in the leaf node 712 and does not test that triangle for intersection with the ray.

As described elsewhere herein, the node iterator 602 traverses through the BVH by iteratively selecting node information from a node collection and providing this node information to the node evaluator 604 for testing the ray against the geometry of the node. To test a pre-filtering node 706 in this manner, the node evaluator performs the setup operations described above in order to obtain setup information and then performs an intersection test using the setup information. As described, part of the setup information includes identifying a point within the bounding volume that bounds the quantized triangle information 708. As described elsewhere herein, efficiency is gained in the situation that the node evaluator 604 is able to obtain this setup information from the pre-filtering node 706 itself, rather than needing to store the information obtained for operations for a different node (e.g., the non-leaf node 702 that parents the pre-filtering node 706). For example, it could be possible to obtain some setup information based on evaluation of such a non-leaf node 702 and then store that information until the pre-filtering node 706 is evaluated by the node evaluator 604. However, such storage is inefficient. For this reason, the node evaluator 604 obtains information for such setup operations from the pre-filtering node 706 itself.

More specifically, the pre-filtering node 706 includes bounding volume information 710. The bounding volume information partially or fully defines the bounding volume of the node reference 704 that points to the pre-filtering node 706. In other words, the bounding volume specified by the bounding volume information 710 is a bounding volume that bounds all of the quantized triangles specified by the quantized triangle information 708.

As stated elsewhere herein, the node evaluator 604 performs setup operations for determining whether the ray (specifically, a quantized version of the ray) intersects the quantized triangles for filtering purposes. One such setup operation includes determining an origin point that is within the bounding box that bounds the quantized triangle information. The node evaluator 604 uses the bounding volume information 710 to obtain this origin point by identifying a point that is close to the ray within the bounding volume.

In one example, the node evaluator 604 identifies such a point by performing a test for intersection of the quantized ray with the bounding volume information 710. This test for intersection naturally produces a point of entry and a point of exit for that bounding volume. Specifically, in some examples, this test determines the intersection point of the ray with the planes that define the bounding volume. The "normal" test for intersection continues by determining whether the intersection point of the ray with a plane for one of the faces of the bounding volume that is closest to the ray origin is closer to the origin of the ray than the intersection point of the ray with a plane for one of the faces of the bounding volume that is farthest from the ray origin. These planes extend past the bounding volume to infinity, so if the intersection of a plane for a farther side ("distance to exit") is earlier than an intersection of a plane for a closer side ("distance to entry"), then the ray is outside of the box. While the normal test uses this end result, this test produces the distance to entry and distance to exit values as intermediate values. By averaging the distance to entry and distance to exit, a point within the bounding volume that is along the length of the ray is obtained. Thus, in one example, to obtain a point within the bounding volume that bounds the quantized triangles of a pre-filtering node, the node evaluator 604 performs a ray-box intersection test using the bounding volume information 710 of the pre-filtering node 706 and takes an average of the distance to entry and distance to exit points. In other examples, the node evaluator 604 performs an operation other than an average to obtain an origin point for the quantized ray that is within the bounding volume that bounds the quantized triangles of the pre-filtering node 706.

In another example operation, the node evaluator 604 performs normalization on the ray in order to compensate for the fact that the numerical extents of the quantized space of the quantized bounding volume for the quantized triangle is uniform in all dimensions. This normalization adjusts the size of the ray in one or more dimensions such that the scaling applied by this uniform bounding volume number space is counteracted in the dimensions of the ray. In an example, using the same numerical values in the integer space for the ray would represent the ray as being too large or too small in one or more directions. In a 2-dimensional example provided for illustration, in the floating point space, the ray has an x dimension of 1 and a y dimension of 2. The bounding volume in the floating space has an x dimension of 3 and a y dimension of 9. However, in the integer space, which is local to the bounding volume, the bounding volume has extents in each direction that extend from the minimum to the maximum value representable by that integer. As these dimensions are effectively uniform, the scale of the bounding volume in the smaller dimension (e.g., x in the example) has been stretched. Thus, in addition to quantizing the ray, the dimensions must also be stretched by an amount based on the relative sizes of the bounding volume dimensions in the floating-point space. In the example, the x dimension of the ray is stretched by 3 (e.g., 9 divided by 3), with a resulting value of 3 in the x dimension and 2 in the y dimension. In some examples, the node evaluator 604 uses the bounding volume information 710 to perform this normalization. In an example, the node evaluator 604 determines the largest dimension of the bounding volume, calculates a respective ratio of the other two dimensions to that largest dimension, and applies the respective ratio (e.g., an independent ratio for each of two different dimensions) to the quantized ray to normalize that ray.

With the ray appropriately quantized in the integer number space of the pre-filtering node 706, the node evaluator 604 determines whether that ray intersects the quantized triangles of the pre-filtering node 706 in any technically feasible way. As described elsewhere herein, in one example, the node evaluator 604 adjusts the quantized vertices of the triangles along the direction of the ray such that the triangle is perpendicular to the ray and then tests whether the origin of the ray is within the triangle in the projected 2D space taken from the point of view of the ray direction (e.g., the 2-dimensional space is one that exists from the point of view of the direction of the ray). As described, this test is computationally less intensive in the integer space than in the floating point space of the leaf node 712, meaning that the work performed in testing the ray against the quantized triangles is more than compensated for by the work saved by eliminating the triangles from consideration. To continue, the node evaluator 604 places an entry into the node collection corresponding to the leaf node 712 that is the child of the pre-filtering node 706, wherein the entry indicates which triangles are possibly intersected by the ray (e.g., the entry indicates which triangles are culled based on the quantized triangle intersection test). Subsequently, the node iterator 602 fetches this entry and requests the node evaluator 604 to perform intersection tests between the ray and the non-culled triangles, which are specified in the leaf node 712. Note that because a pre-filtering node includes information for multiple quantized triangles 708, the setup operations for the ray (e.g., determining the origin point and normalizing the ray) can occur only once for all of the triangles in the pre-filtering node 706. This is helpful for parallelization of the tests for the ray against the quantized triangles, as the amount of hardware (e.g., die area) required for such setup can be amortized across the different triangles that can be tested in parallel.

Figure 8:
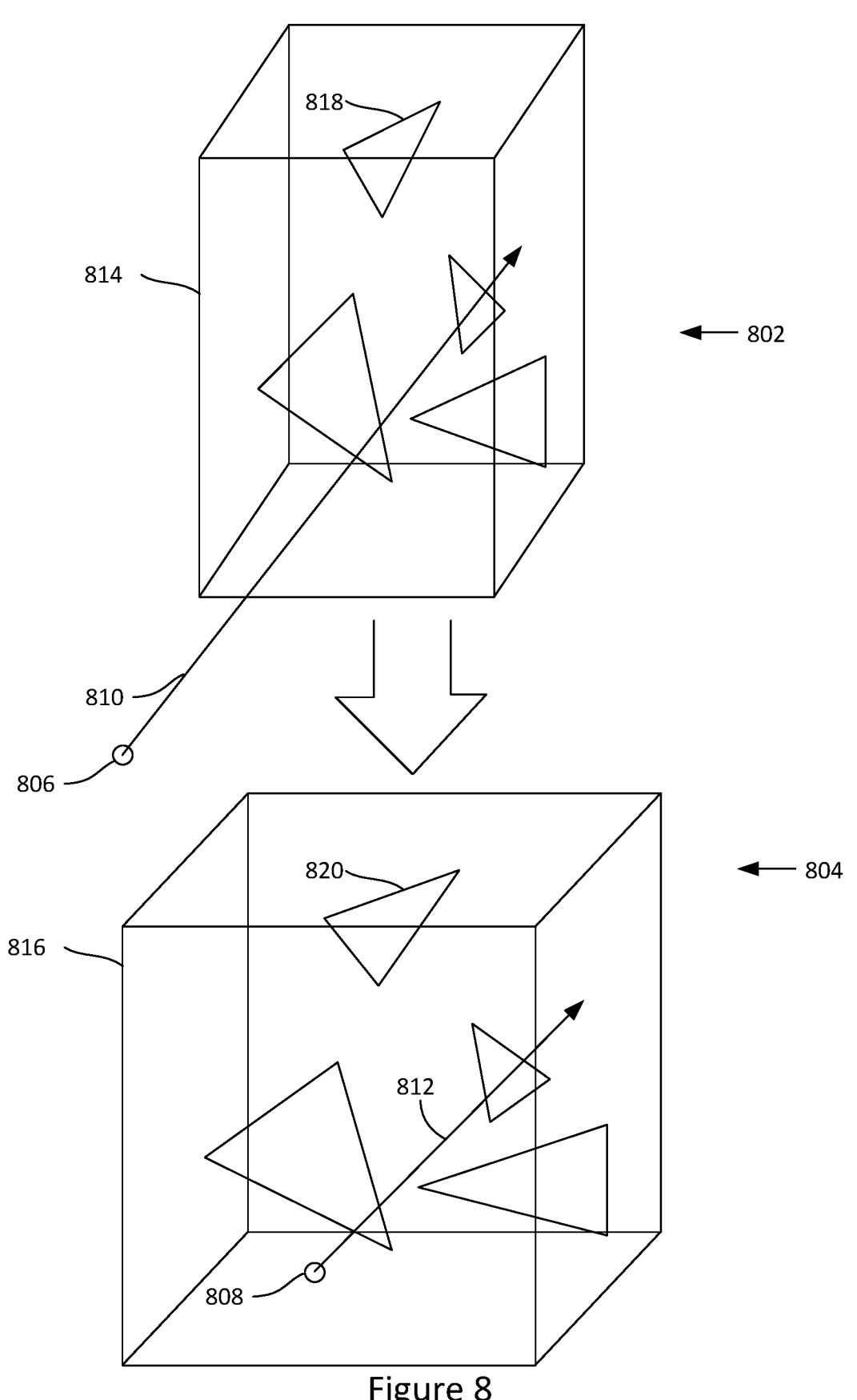
FIG. 8 illustrates setup operations performed by the node evaluator for a fetched pre-filtering node, according to an example.

FIG. 8 illustrates setup operations performed by the node evaluator 604 for a fetched pre-filtering node 706, according to an example. In FIG. 8, floating-point geometry 802 and quantized geometry 804 are shown. The setup operations include quantizing the floating-point geometry 802, adjusting the origin 806 of the ray 810 to generate an origin 808 for the quantized ray 812, and normalizing the ray.

The floating-point geometry 802 includes a bounding volume 814 (specified, e.g., by a non-leaf node 702), triangles 818, and a ray 810, which has an origin 806 and a direction. The quantized geometry 804 includes a quantized bounding volume 816 (e.g., specified by the bounding volume information 710), quantized triangles 820 (e.g, specified by the quantized triangle information 708), and a quantized ray 812 having a quantized origin 808 within the bounding volume 816, and a quantized direction. The setup includes determining a point within the quantized bounding volume 816, which is the origin of the ray 812, and normalizing the ray. Thus, unlike with the floating-point geometry 802, in which the origin 806 is outside of the box, with the quantized geometry 804, the origin 808 is within the box. Further, the quantized ray 812 is stretched at least in the horizontal direction, as part of the normalization process.

In some examples, the bounding volume information 710 includes a minimum extent for the bounding volume (e.g., minimum x, y, and z coordinates of the bounding volume) and the extents (e.g., minimum and maximum values) of the quantized triangles 708, which allows the node evaluator 604 to generate the quantized bounding volume.

Figure 9:
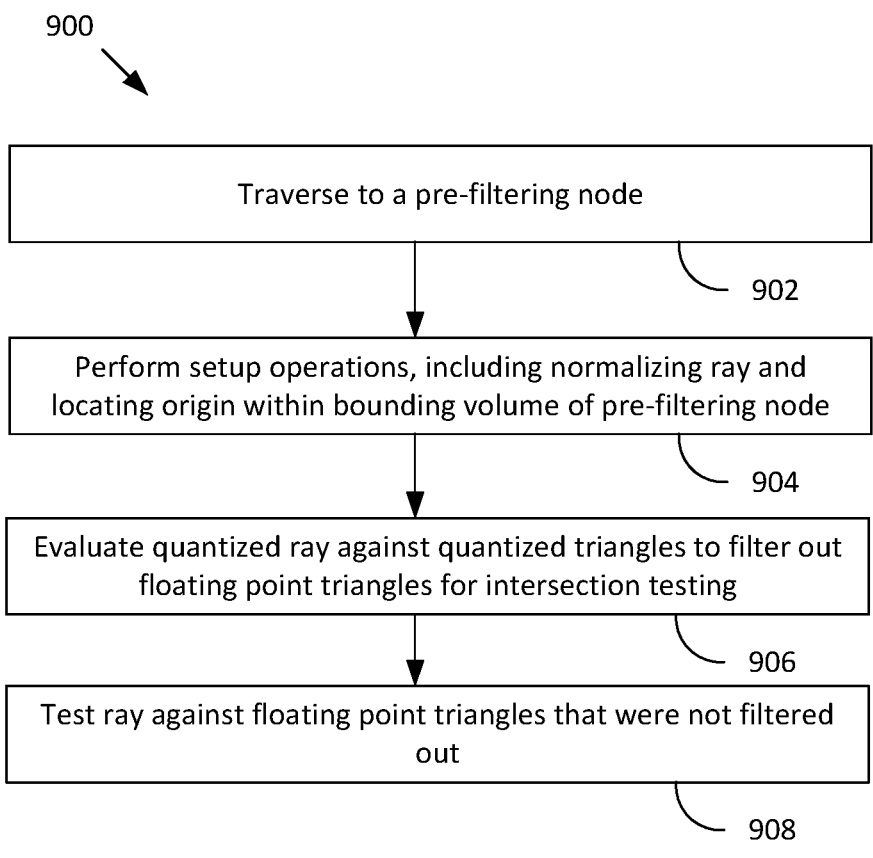
FIG. 9 is a flow diagram of a method for performing ray tracing operations, according to an example.

FIG. 9 is a flow diagram of a method 900 for performing ray tracing operations, according to an example. Although described with respect to the system of FIGS. 1-8, those of skill in the art will understand that any system, configured to perform the steps of the method 900 in any technically feasible order, falls within the scope of the present disclosure.

At step 902, the node iterator 602 traverses to a pre-filtering node 706. In some examples, this traversal is the result of a previous determination by the node evaluator 604 that a ray at issue intersects a bounding volume specified by a node reference 704 that points to the pre-filtering node 706. As should be understood, this traversal is part of a broader traversal of a BVH for a ray, in order to determine what geometry of the BVH is intersected by the ray. The node iterator 602 causes the node evaluator 604 to process the pre-filtering node 706, determining whether a quantized version of the ray intersects the quantized triangles of the pre-filtering node 706, in order to discard triangles from consideration.

At step 904, node evaluator 604 performs setup operations for testing the quantized ray for intersection with the quantized triangles. The setup operations include normalizing the ray as well as locating the origin of the ray within the bounding volume of the pre-filtering node. In some examples, the normalizing compensates for the uniformity of the numerical integer space as described elsewhere herein. In some examples, locating the origin includes identifying a point along the ray that is within the bounding volume that bounds the quantized triangles of the pre-filtering node 706. In some examples, this locating is performed by averaging the entry and exit points of the ray determined by a ray-box intersection test.

At step 906, the node evaluator 604 evaluates the quantized ray against the quantized triangles of the pre-filtering node 706. In some examples, evaluating the ray includes determining whether the ray intersects the quantized triangle, as described elsewhere herein. At step 908, the node evaluator 604 tests the floating-point ray against the floating-point triangles that were not filtered out. In some examples, this testing occurs after the node evaluator 604 has returned results of the testing for the pre-filtering node 706 to the node iterator 602 and the node iterator has requested the node evaluator 604 to test the floating-point triangles of the corresponding leaf node 712 for intersection with the ray.

Although it has been described that certain operations are performed by the node iterator 602 and the node evaluator 604, in some examples, any or all the operations described as being performed by either of those elements are instead performed by any other element.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the compute units 132, the SIMD units 138, the ray tracing pipeline 300, including the ray generation shader 302, the ray intersection test unit 304, the any hit shader 306, the hit or miss unit 308, the closest hit shader 310, the miss shader 312, the acceleration structure traversal stage 600, the node iterator 602, or the node evaluator 604 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:

for a ray being tested for intersection with geometry associated with a bounding volume hierarchy ("BVH"), traversing to a pre-filtering node that includes quantized triangles for filtering out triangles of a leaf node of the bounding volume hierarchy, wherein the pre-filtering node comprises a node of the BVH that points to the leaf node;

evaluating a quantized ray that corresponds to the ray against the quantized triangles of the pre-filtering node to filter out one or more triangles of the leaf node from consideration;

testing the triangles of the leaf node that are not filtered out and not testing the triangles of the leaf node that are filtered out; and rendering an image based on the testing.

2. The method of claim 1, wherein evaluating the quantized ray against the quantized triangles includes quantizing the ray to generate the quantized ray.

3. The method of claim 2, wherein quantizing the ray includes determining an origin point that is within a bounding volume that bounds that quantized triangles of the pre-filtering node.

4. The method of claim 3, wherein determining the origin point is based on a point of entry and a point of exit of the quantized ray into and out of the bounding volume.

5. The method of claim 2 wherein quantizing the ray includes normalizing the ray.

6. The method of claim 5, wherein normalizing the ray includes modify dimensions of the ray based on the dimensions of a bounding volume associated with the pre-filtering node.

7. The method of claim 6, wherein traversing to the pre-filtering node occurs in response to determining that the ray intersects the bounding volume.

8. The method of claim 1, wherein evaluating the quantized ray against the quantized triangles includes testing the quantized ray for intersection with the quantized triangles.

9. The method of claim 1, wherein the quantized triangles have vertices expressed in an integer number space.

10. A system for performing ray tracing operations, the system comprising:

a memory configured to store at least a portion of a bounding volume hierarchy; and a processor configured to:

for a ray being tested for intersection with geometry associated with a bounding volume hierarchy ("BVH"), traverse to a pre-filtering node that includes quantized triangles for filtering out triangles of a leaf node of the bounding volume hierarchy, wherein the pre-filtering node comprises a node of the BVH that points to the leaf node;

evaluate a quantized ray that corresponds to the ray against the quantized triangles of the pre-filtering node to filter out one or more triangles of the leaf node from consideration;

test the triangles of the leaf node that are not filtered out and not testing the triangles of the leaf node that are filtered out; and render an image based on the testing.

11. The system of claim 10, wherein evaluating the quantized ray against the quantized triangles includes quantizing the ray to generate the quantized ray.

12. The system of claim 11, wherein quantizing the ray includes determining an origin point that is within a bounding volume that bounds that quantized triangles of the pre-filtering node.

13. The system of claim 12, wherein determining the origin point is based on a point of entry and a point of exit of the quantized ray into and out of the bounding volume.

14. The system of claim 11 wherein quantizing the ray includes normalizing the ray.

15. The system of claim 14, wherein normalizing the ray includes modify dimensions of the ray based on the dimensions of a bounding volume associated with the pre-filtering node.

16. The system of claim 15, wherein traversing to the pre-filtering node occurs in response to determining that the ray intersects the bounding volume.

17. The system of claim 10, wherein evaluating the quantized ray against the quantized triangles includes testing the quantized ray for intersection with the quantized triangles.

18. The system of claim 10, wherein the quantized triangles have vertices expressed in an integer number space.

19. A non-transitory computer-readable medium storing instructions that, when executed by a processor, cause the processor to perform operations comprising:

for a ray being tested for intersection with geometry associated with a bounding volume hierarchy ("BVH"), traversing to a pre-filtering node that includes quantized triangles for filtering out triangles of a leaf node of the bounding volume hierarchy, wherein the pre-filtering node comprises a node of the BVH that points to the leaf node;

evaluating a quantized ray that corresponds to the ray against the quantized triangles of the pre-filtering node to filter out one or more triangles of the leaf node from consideration;

testing the triangles of the leaf node that are not filtered 5 out and not testing the triangles of the leaf node that are filtered out; and rendering an image based on the testing.

20. The non-transitory computer-readable medium of claim 19, wherein evaluating the quantized ray against the 10 quantized triangles includes quantizing the ray to generate the quantized ray.

\* \* \* \* \*